United States Patent [19]
Ahn

[11] Patent Number: 5,138,487
[45] Date of Patent: * Aug. 11, 1992

[54] DOOR VIEWER

[75] Inventor: Chul H. Ahn, Seoul, Rep. of Korea

[73] Assignee: Seung H. Han, Seoul, Rep. of Korea

[ * ] Notice: The portion of the term of this patent subsequent to Jan. 9, 2007 has been disclaimed.

[21] Appl. No.: 639,654

[22] Filed: Jan. 9, 1991

[51] Int. Cl.$^5$ .................. G02B 25/04; G02B 23/02
[52] U.S. Cl. .................. 359/431; 359/744; 359/831; 359/894
[58] Field of Search ............... 350/569, 538, 575, 286, 350/319, 453, 457, 474; 359/431, 831, 837, 894, 744, 748, 784

[56] References Cited

U.S. PATENT DOCUMENTS

| | | | |
|---|---|---|---|
| 2,424,283 | 7/1947 | Miles | 350/569 |
| 3,514,188 | 5/1970 | Blosse et al. | 350/319 |
| 4,082,434 | 4/1978 | Hayashi et al. | 350/474 |
| 4,116,529 | 9/1978 | Yamaguchi | 350/453 |
| 4,257,670 | 3/1981 | Legrand | 350/319 |
| 4,269,474 | 5/1981 | Kamimura | 350/453 |
| 4,327,968 | 5/1982 | Yevick | 350/286 |
| 4,730,911 | 3/1988 | Wood et al. | 350/319 |
| 4,761,065 | 8/1988 | Lee | 350/576 |
| 4,892,399 | 1/1990 | Ahn | 350/569 |

FOREIGN PATENT DOCUMENTS

| | | | |
|---|---|---|---|
| 2840600 | 9/1979 | Fed. Rep. of Germany | 350/453 |
| 52-37447 | 3/1977 | Japan | 350/453 |
| 55-101908 | 8/1980 | Japan | 350/453 |

*Primary Examiner*—Frank Gonzalez
*Attorney, Agent, or Firm*—McAulay Fisher Nissen Goldberg & Kiel

[57] ABSTRACT

A door viewer includes two prisms of rectangular isosceles triangle shape in cross section whose hypotenuse surface abut horizontally, a front convex lens and a plano-convex eyepiece lens. The front convex lens has a front concave surface and a rear convex surface to correct chromatic aberration. The convex surfaces of the front and eyepiece lens are positioned face to face with each other to correct barrel distortion. The view casts an image onto a ground glass section formed on or provided abutting the eyepiece lens.

6 Claims, 3 Drawing Sheets ized.

DOOR VIEWER

CROSS REFERENCE TO RELATED PATENT

This application is related to U.S. Pat. No. 4,892,399 to Ahn.

TECHNICAL FIELD

The present invention relates to a door viewer mounted in a door, and more particularly to a door viewer through which one can see visitors in front of the door.

BACKGROUND

Various types of optical devices have been proposed. For example, as shown in FIG. 3A, U.S. Pat. No. 4,082,434 discloses a wide-angle optical system for a door viewer comprising a concave objective lens 21, an intermediate concave lens 22 and a convex eyepiece lens 23 which is positioned at a predetermined distance from the objective lens 21. The aberration of the erect virtual image derived from the objective lens 21 is corrected by the intermediate lens 22, the image from the intermediate lens 22 is magnified by the eyepiece lens 23 and thus the magnified final erect virtual image is formed on the eyepiece lens 23.

On the other hand, as shown in FIG. 3B, U.S. Pat. No. 4,257,670 disclosed an optical peephole device which is constituted by an optical system composed of three lens assemblies disposed serially along a common optical axis. The first assembly has a doublet constituted by a thick-edged meniscus 31 and a double-concave lens 32, the second assembly has five identical plano-convex lens 33, 34, 35, 36, and 37 that are equidistantly spaced from each other, and the third assembly provides accommodation and is made of a plano-convex lens 38 and an eyepiece 61. In this device, an erect virtual image from the meniscus 31 becomes an inverted real image through the plano-convex lens 33, other plano-convex lenses 34 through 38 correct the aberration and invert again the inverted real image, and thus the final erect real image is formed on the plano-convex lens 38.

However, the former has defects in that as a virtual image is cast on the eyepiece lens, it cannot be made visible on an image formation means such as a ground glass, and therefore the user's eye must be close to the eyepiece lens to view an outside caller or object. Further, because of the small effective diameter of the concave objective lens, the image formed on the eyepiece lens becomes dark due to small amount of incident light. Moreover, when the effective diameter of the concave objective lens is increased in order to brighten the dark image, the caller can view the inside of the door from outside.

The latter device also had disadvantages that though the image derived from the plano-convex lens is erect and real, the luminosity of the formed image is poor due to a large loss of light through the several lenses, no image formation means such as the ground glass can be employed and the user's eye must be close to the eyepiece. Furthermore, the latter device is not suitable for being mounted in a door but suitable for being inserted through a peephole in the thick wall of a chamber because of its large overall length.

In related U.S. Pat. No. 4,892,399 to Ahn, a door viewer projects an image on a ground glass screen. However additional efforts have been made to simplify and reduce the cost of such a door viewer, while still providing a clear cast image on the ground glass screen.

SUMMARY OF THE INVENTION

It is, therefore, an object of the present invention to provide a wide angle door viewer which makes it possible to see a bright and clear image even from a position 1-2 meters away from the door viewer without pressing the eye to the eyepiece lens, thereby solving the above-mentioned disadvantages.

It is another object of the present invention to provide a short door viewer whose length is similar to the thickness of an ordinary door, and thus the length that the door viewer protrudes inside the door is short when mounted in the door.

It is another object of the present invention to provide such a short door viewer of simple, low cost construction.

To accomplish the above object, the door viewer according to the present invention comprises two prisms whose hypotenuse surfaces abut horizontally, a front convex lens to invert again the image inverted by the prisms, and a rear convex eyepiece lens all disposed serially along a common optical axis so that an erect real image is cast clearly onto the rear convex eyepiece lens.

BRIEF DESCRIPTION OF THE DRAWINGS

The invention will now be described in more detail with reference to the accompanying drawings, in which.

DETAILED DESCRIPTION OF THE INVENTION

Figure 1:
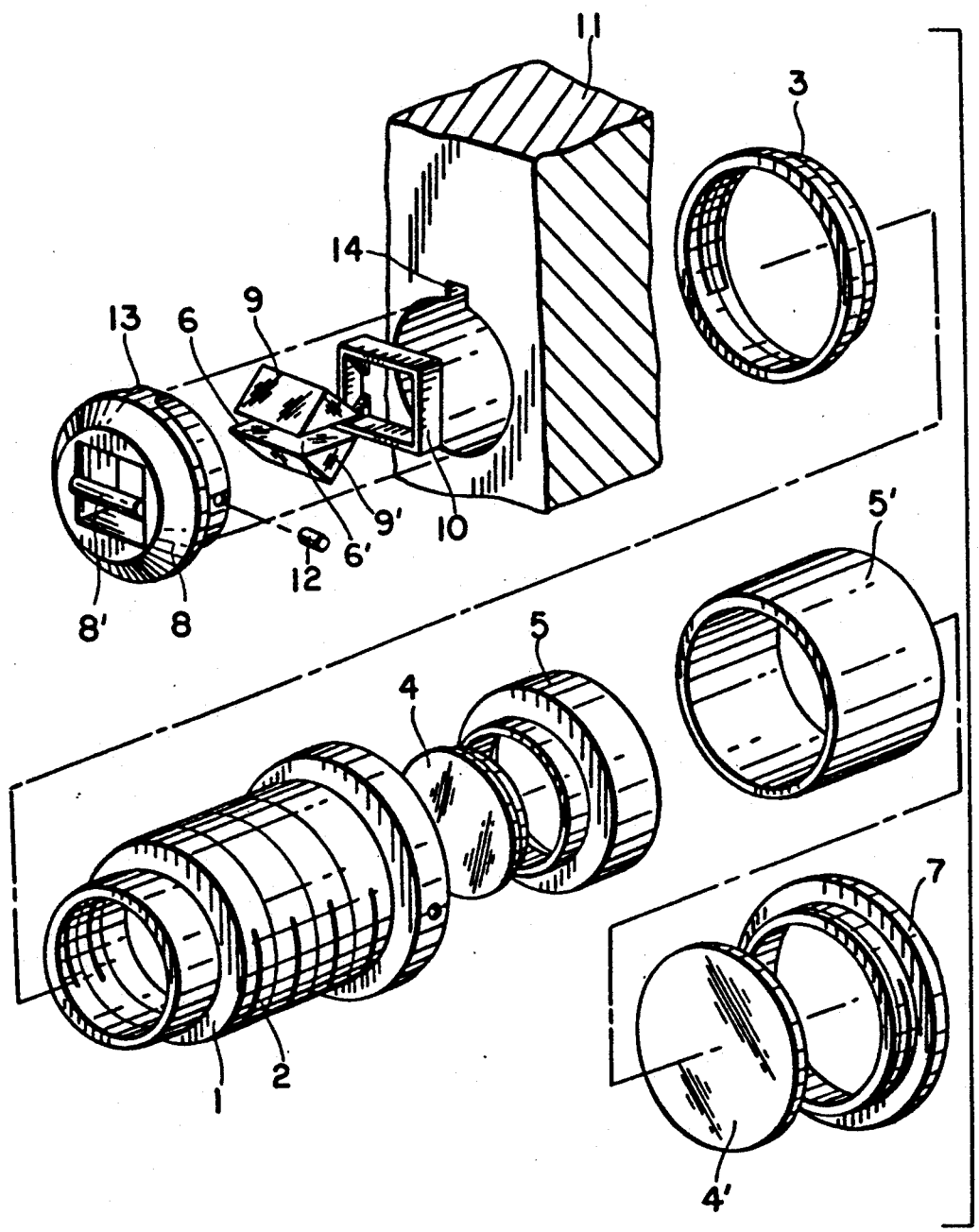
FIG. 1 is an exploded perspective view of a door viewer in accordance with an embodiment of the present invention.
Figure 2:
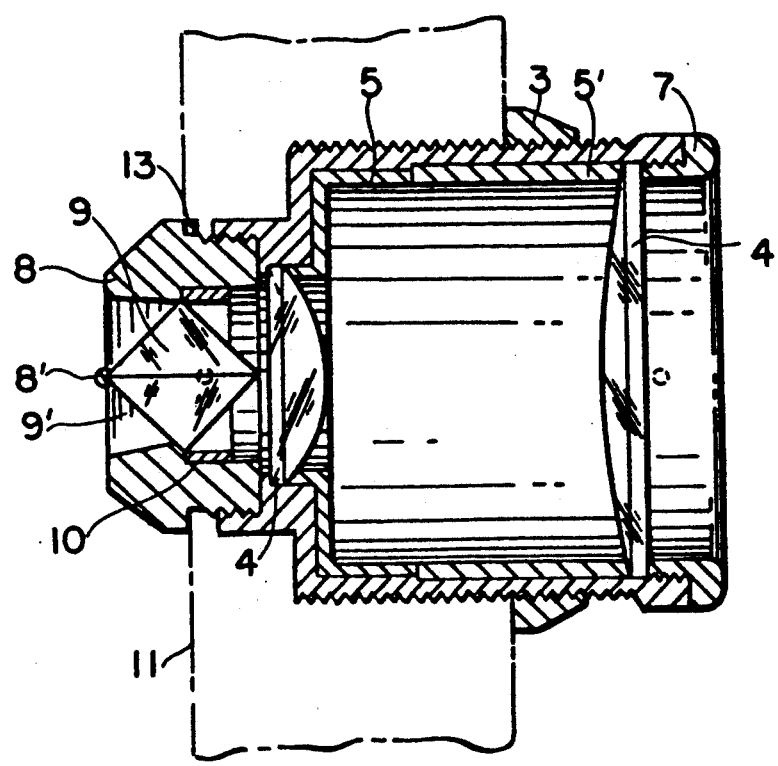
FIG. 2 is a longitudinal sectional view of the door viewer shown in FIG. 1.
Figure 3A:
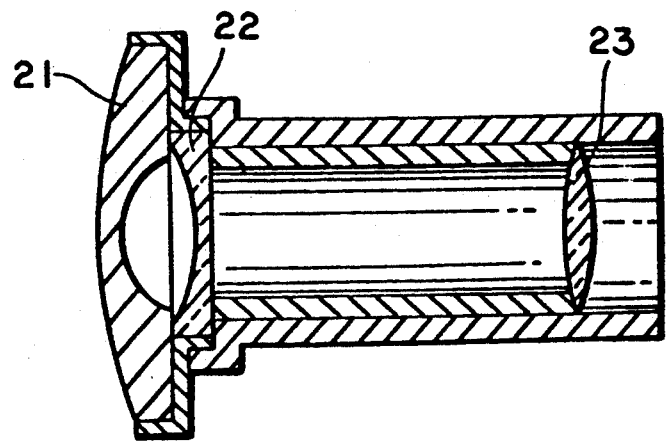
FIGS. 3A and 3B are longitudinal sectional views of conventional optical devices.
Figure 3B:
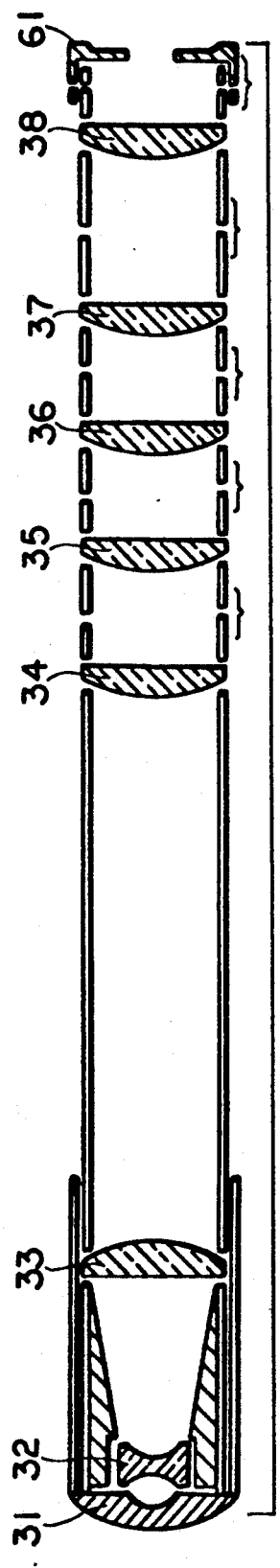

Referring to FIGS. 1 and 2 which show a preferred embodiment of the present invention, the hypotenuse surface of two prisms 9 and 9' abut horizontally to increase the light incident area.

The prisms 9 and 9' are inserted in prism holder 8 with their angles supported by a holding member 8', a holding frame 10 and a fixing screw 12. A front convex lens 4 and a rear convex eyepiece lens 4' are inserted in a lens barrel 1 and positioned at predetermined distances corresponding to their focal lengths by means of holding sleeves 5 and 5' which are also inserted in the lens barrel 1. The rear portion of the lens barrel 1 is screw engaged with a holding ring 7.

When the door viewer is mounted in the door 11, the lens barrel 1 is put into the through-hole of the door 11 from the inside, the prism holder 8 is screw engaged with the front portion of the lens barrel 1, and then a mount ring 3 is screw engaged with threads 2 formed on the outer face of the lens barrel 1 to mount the door viewer firmly in the door 11. At this time, a protrusion 13 formed on the upper part of the prism holder 8 is received within a groove 14 on the upper part of the through-hole of the door 11 to prevent the prism holder 8 and the lens barrel 1 from rotating.

The image of an outside caller or object becomes a bright inverted real image through the prisms 9 and 9' and the front convex lens 4 corrects the aberration and inverts again the inverted real image derived from the prisms 9 and 9' to an erect real image as a radius of curvature of a front concave surface of the front convex lens 4 is larger than that of a rear convex surface thereof. While an intermediate plano-convex lens may be used to widen the angle of view and magnify the erect real image from the front convex lens 4, as described in U.S. Pat. No. 4,892,399, such a lens is optional and is eliminated in the present invention to simplify construction and cost. The image remains clear on the ground glass screen though the viewing angle may be reduced from about 110° to about 90°.

Among lenses of the same effective diameter, the luminosity of a lens increases as its focal length decrease. Therefore, the rear convex lens 4' having a short focal length widens the angle of view and increases the luminosity of the image from the front convex lens 4.

Meanwhile, in this embodiment, the rear planar surface of the rear convex lens 4' is ground finely to be used as an image formation screen and thus the erect real image from the rear convex lens 4' is formed brightly and clearly on its ground surface.

Also, chromatic aberrations can be corrected by marking the radius of curvature of the front concave surface of the front convex lens 4 larger than that of the rear convex surface thereof.

Alternatively, instead of grinding the rear surface of the convex lens 4', a ground glass can be mounted to abut the rear surface thereof.

In the disclosed embodiment, the best luminosity can be obtained by employing two right-angled prisms 9 and 9' positioning their hypotenuse surface 6 and 6' in contact with each other.

From the foregoing, it will be apparent that the present invention provides advantages in that the image of the caller or object is cast onto the rear ground surface of the eyepiece lens or the ground glass as a bright and clear real image even from a position 1–2 meters away from the door viewer and that the length the door viewer protrudes inside the door is short when mounted in the door.

Whereas the present invention has been described in particular relation to the drawings attached hereto, it should be understood that other and further modifications, apart from those shown or suggested therein, may be made within the spirit and scope of this invention.

What is claimed is:

1. A door viewer comprising:
   two prisms whose hypotenuse surfaces abut to invert the image of an outside caller;
   a front convex lens inverting again said image inverted by said prisms and having a front concave surface and a rear convex surface; and
   a rear convex eyepiece lens positioned at a predetermined distance from said front convex lens corresponding to the focal lengths of said front convex lens and said rear convex eyepiece lens.

2. A door viewer as claimed in claim 1 wherein said prisms are right-angled prisms and surfaces opposite to right angles of said prisms abut horizontally.

3. A door viewer as claimed in claim 1 wherein the radius of curvature of said front concave surface of said front convex lens is larger than that of said rear convex surface thereof to correct chromatic aberration.

4. A door viewer as claimed in claim 1 wherein said rear convex eyepiece lens is a plano-convex lens and is arranged with its convex surfaces positioned face to face with the front convex lens to correct barrel distortion.

5. A door viewer as claimed in claim 1 wherein said rear convex eyepiece lens has a finely ground rear planar surface to function as an image formation screen.

6. A door viewer as claimed in claim 1 wherein a ground glass is installed to contact at said rear planar surface of said rear convex eyepiece lens.

* * * * *